United States Patent
DeFranks et al.

(10) Patent No.: US 11,058,228 B2
(45) Date of Patent: Jul. 13, 2021

(54) FIRE RESISTANT PANEL INCLUDING VERTICALLY ORIENTED FIRE RETARDANT TREATED FIBERS AND AN ADAPTIVE COVERING MATERIAL

(71) Applicant: DREAMWELL, LTD., Las Vegas, NV (US)

(72) Inventors: Michael S. DeFranks, Decatur, GA (US); James P. Ross, Atlanta, GA (US)

(73) Assignee: DREAMWELL, LTD., Doraville, GA (US)

( * ) Notice: Subject to any disclaimer, the term of this patent is extended or adjusted under 35 U.S.C. 154(b) by 0 days.

(21) Appl. No.: 14/547,669

(22) Filed: Nov. 19, 2014

(65) Prior Publication Data

US 2015/0147518 A1 May 28, 2015

Related U.S. Application Data

(60) Provisional application No. 61/909,507, filed on Nov. 27, 2013.

(51) Int. Cl.
*A47C 31/00* (2006.01)
*D06N 7/00* (2006.01)
(Continued)

(52) U.S. Cl.
CPC .............. *A47C 31/001* (2013.01); *B32B 5/08* (2013.01); *B32B 5/18* (2013.01); *B32B 5/245* (2013.01);
(Continued)

(58) Field of Classification Search
CPC .............. D06N 7/00; D06N 2209/067; D06N 2209/141; D06N 2209/142;
(Continued)

(56) References Cited

U.S. PATENT DOCUMENTS 5,690,874 A * 11/1997 Bell .......................... D01F 2/00
106/18.14
5,702,801 A 12/1997 Chien
(Continued)

FOREIGN PATENT DOCUMENTS

WO 2003049581 A2 6/2003
WO 2005111288 A1 11/2005
(Continued)

OTHER PUBLICATIONS

Search Report issued in European Application No. 14194909.9-130; dated May 18, 2015; 6 pages.

*Primary Examiner* — Cheryl Juska
(74) *Attorney, Agent, or Firm* — Cantor Colburn LLP

(57) ABSTRACT

Flame retardant panels generally include an adaptive cover layer and underlying batting layer. The cover layer includes a moisture vapor permeable synthetic fibrous layer, and a liquid impermeable but moisture vapor permeable thermoplastic layer disposed on an outer face of the cover layer, wherein the liquid impermeable but moisture vapor permeable thermoplastic layer is in an amount of about 2 to 15% by weight based on a total weight of the synthetic fibrous layer and the thermoplastic layer. The underlying batting layer can have a top surface and a bottom surface, the layer comprising a plurality of substantially vertically oriented flame retardant treated fibers extending from the top surface to the bottom surface; and a binder material.

11 Claims, 7 Drawing Sheets

(51) Int. Cl.
*B32B 5/18* (2006.01)
*D04H 1/4258* (2012.01)
*D04H 1/02* (2006.01)
*B32B 5/08* (2006.01)
*B32B 5/24* (2006.01)
*B32B 5/26* (2006.01)
*D04H 1/74* (2006.01)
*D04H 1/4382* (2012.01)
*D04H 1/435* (2012.01)
*D04H 1/4291* (2012.01)

(52) U.S. Cl.
CPC .............. *B32B 5/26* (2013.01); *D04H 1/02* (2013.01); *D04H 1/4258* (2013.01); *D04H 1/4291* (2013.01); *D04H 1/435* (2013.01); *D04H 1/4382* (2013.01); *D04H 1/74* (2013.01); *B32B 2260/021* (2013.01); *B32B 2262/0253* (2013.01); *B32B 2262/0276* (2013.01); *B32B 2262/04* (2013.01); *B32B 2262/062* (2013.01); *B32B 2262/065* (2013.01); *B32B 2307/21* (2013.01); *B32B 2307/304* (2013.01); *B32B 2307/3065* (2013.01); *B32B 2307/718* (2013.01); *B32B 2307/728* (2013.01); *B32B 2307/73* (2013.01); *B32B 2601/00* (2013.01); *D06N 2209/067* (2013.01); *D06N 2209/141* (2013.01); *D06N 2209/142* (2013.01); *D06N 2209/146* (2013.01); *D10B 2201/22* (2013.01); *D10B 2401/021* (2013.01); *D10B 2401/022* (2013.01); *D10B 2401/04* (2013.01); *Y10T 428/23986* (2015.04)

(58) Field of Classification Search
CPC ... D06N 2211/14; A47C 31/00; A47C 31/001; D04H 1/70; D04H 1/74; D04H 1/76; D04H 1/4258; B32B 2307/73; B32B 2307/728; B32B 2307/718; B32B 2307/3065; B32B 2601/00; D10B 2201/20; D10B 2201/22; D10B 2401/02; D10B 2401/021; D10B 2401/022; D10B 2401/04
See application file for complete search history.

(56) References Cited

U.S. PATENT DOCUMENTS

| | | | | |
|---|---|---|---|---|
| 5,912,196 A * | 6/1999 | Radwanski | ............ | C09K 21/04 442/139 |
| 6,602,581 B2 * | 8/2003 | Aneja | ............ | A47G 9/10 156/205 |
| 7,361,617 B2 * | 4/2008 | Ahluwalia | ............ | C09D 5/18 428/920 |
| 7,736,696 B2 | 6/2010 | Piana et al. | | |
| 7,816,287 B1 * | 10/2010 | Hartgrove | ............ | B32B 5/02 428/920 |
| 7,827,637 B2 * | 11/2010 | DeFranks | ............ | A47C 27/005 5/483 |
| 7,849,542 B2 * | 12/2010 | DeFranks | ............ | A47C 31/001 5/698 |
| 8,367,203 B2 * | 2/2013 | Ruf | ............ | D01F 1/10 106/162.1 |
| 8,414,732 B2 * | 4/2013 | DeFranks | ............ | A47C 31/001 156/308.2 |
| 8,904,578 B2 * | 12/2014 | Saunders | ............ | A47C 19/005 5/200.1 |
| 2004/0062912 A1 * | 4/2004 | Mason | ............ | D04H 1/4266 428/139 |
| 2004/0121114 A1 * | 6/2004 | Piana | ............ | D06M 11/82 428/85 |
| 2005/0118919 A1 * | 6/2005 | Link | ............ | D04H 1/498 442/414 |
| 2005/0215152 A1 * | 9/2005 | Ahluwalia | ............ | A47C 31/001 442/152 |
| 2005/0245164 A1 * | 11/2005 | Aneja | ............ | A47C 27/12 442/414 |
| 2006/0021148 A1 * | 2/2006 | Weller, Jr. | ............ | A47C 27/122 5/698 |
| 2007/0186353 A1 * | 8/2007 | Fang | ............ | D06M 11/70 8/115.51 |
| 2007/0298668 A1 * | 12/2007 | DeFranks | ............ | A47C 31/001 442/59 |
| 2008/0124993 A1 | 5/2008 | Brady | | |
| 2008/0254699 A1 * | 10/2008 | Mio | ............ | A47C 31/001 442/302 |
| 2010/0173084 A1 * | 7/2010 | Piana | ............ | D06M 11/82 427/379 |
| 2011/0061784 A1 * | 3/2011 | DeFranks | ............ | A47C 31/001 156/60 |
| 2011/0250409 A1 | 10/2011 | Marte et al. | | |
| 2012/0156486 A1 * | 6/2012 | Bisjak | ............ | D01F 1/07 428/375 |
| 2012/0183695 A1 * | 7/2012 | Piana | ............ | D06M 11/82 427/345 |
| 2013/0081238 A1 * | 4/2013 | Link | ............ | D04H 1/435 28/107 |
| 2013/0149518 A1 * | 6/2013 | Jones | ............ | A47C 31/001 428/220 |
| 2014/0211113 A1 * | 7/2014 | DeFranks | ............ | G02F 1/132 349/20 |
| 2015/0096125 A1 * | 4/2015 | DeFranks | ............ | A47C 31/001 5/698 |
| 2017/0231401 A1 * | 8/2017 | McGuire | ............ | A47C 31/001 5/698 |
| 2018/0249843 A1 * | 9/2018 | DeFranks | ............ | B68G 3/00 |
| 2018/0255940 A1 * | 9/2018 | Renaud | ............ | A47C 27/122 |
| 2019/0090653 A1 * | 3/2019 | Moore, III | ............ | D04H 1/492 |
| 2019/0298076 A1 * | 10/2019 | Lim | ............ | A47C 21/046 |
| 2020/0085205 A1 * | 3/2020 | Moore, III | ............ | A47C 31/001 |
| 2020/0113345 A1 * | 4/2020 | DeFranks | ............ | D06M 11/32 |

FOREIGN PATENT DOCUMENTS

| | | | | |
|---|---|---|---|---|
| WO | 2011045673 A1 | 4/2011 | | |
| WO | WO-2014100841 A2 * | 7/2014 | ............ | D06P 3/6008 |
| WO | 2015050702 A1 | 4/2015 | | |

* cited by examiner

COTTON

VISCOSE

MODAL

LYOCELL

FIRE RESISTANT PANEL INCLUDING VERTICALLY ORIENTED FIRE RETARDANT TREATED FIBERS AND AN ADAPTIVE COVERING MATERIAL

CROSS REFERENCE TO RELATED APPLICATIONS

This non-provisional application claims the benefit of U.S. Provisional Patent Application Ser. No. 61/909,507 filed Nov. 27, 2013, which is fully incorporated herein by reference in its entirety

BACKGROUND

The present disclosure generally relates to fire resistant panels including vertically oriented fire retardant treated fibers and an adaptive covering material.

Today, there is an increasing interest in adding flame resistant characteristics to mattresses and other furniture. For example, mattress and mattress sets sold in the United States are required to meet an open flame requirement as codified in 16 C.F.R. Part 1633 (2007). While materials used to meet these requirements vary from product to product, the overall approach has generally been to encase the mattress with a flame resistant barrier material underlying the outermost mattress layer e.g., fabric layer, ticking layer, and the like. The materials used by most mattress manufacturers are non-woven high loft or needle punched fiber batting; although, knitted sock-style barrier materials are also used albeit to a lesser extent.

Commercially available fire resistant battings are typically carded and cross lapped, whereby multiple thin layers of horizontally oriented fiber webs are laid on top of one another, wherein each successive fiber web is laid generally perpendicular to the preceding layer. One process for bonding the web together is via thermal bonding. With a thermal bonding process the layered web is then passed though an oven where a meltable binder such as a low melting polyester or low melting copolymer polyester serves as a binder to bind and hold the web together. Suitable low melting binders such as polyester can have a melting point generally less than 130° C. In some embodiments, the binder is a bi-component material having a core with a higher melting point than a surround encapsulating the core such that during thermal processing the surround is heated to a temperature greater than melting point of the surround but less than the melting point of the core to effect softening and/or melting of the surround, which functions to bind the fibers. Prior art FIG. 1 provides a cross sectional view depicting a non-woven batting 10 including horizontally oriented fibers webs 12. Other commercially available fire resistant batting manufacturers employ the use of needles that penetrate the horizontally oriented fiber layered web through the web layers to effect fiber entanglement as a means to mechanically hold the web together. The resulting cross sectional structure can generally be defined as primarily composed of horizontally oriented fiber webs. Regardless of the method of manufacturer, typically, the fire resistant battings are of a relatively low loft and also of low resilience following compression such as may occur during use.

While current flame retardant battings may meet the standards set forth in 16 C.F.R. Part 1633, many of these commercial offerings offer little in the way of user comfort. Moreover, commercially available fire resistant battings are generally insulative and do little with regard to temperature management and moisture control.

In addition to providing fire resistant characteristics to mattresses and other furniture, there is a need for covering materials that are adaptive to external stimuli and comprise a fabric that based on its intrinsic features, contributes to the functional characteristics of the covering material such as thermal regulation, dryness, insulation, and texture perception upon touch.

Covering materials for mattresses and the like have been known for a considerable time and are designed to protect them from liquids which may be accidentally spilled on the mattress or on the mattress cover. Such covering materials are particularly relevant in environments where a mattress is used by different users, such as in hospitals, hotels, nursery homes, hotels, rental houses or home care.

A major drawback of prior art covering materials is that the functionality is generally static. As a consequence, prior art covering materials can become uncomfortable to lie on due to accumulated heat, accumulated moisture, the relative low friction and thereby sliding of the bed sheets on the plastic film, and the unpleasant "plastic-like" feeling experienced when touching the material. A further drawback is the fact that these prior art covering materials have no compressible or resilient properties, so that when a force is exerted on this material for a relatively long period of time by for example an object, a human being or an animal, the material generates insufficient pressure relief on this object, or this person or this animal, as a result of which there is a great risk for this person or this animal suffering pressure injuries, i.e. decubitus.

Accordingly, there is a need for improved fire resistant panels such as those employed as batting materials for use in mattresses, for use in upholstered furniture, and the like.

BRIEF SUMMARY

Disclosed herein are flame resistant panels comprising an adaptive cover layer with a multifunctional layer disposed on a fabric, wherein the multifunctional layer comprises a first functional component and a second functional component, the second functional component having a chemical-functional and constitutional specification for responsive behavior or a responsive property reversibly switchable by external stimulus and an underlying layer comprising a plurality of substantially vertically oriented flame retardant treated fibers extending from the top surface to the bottom surface.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike.

Prior Art

DETAILED DESCRIPTION

Disclosed herein are flame resistant panels for use in cushioning articles. The flame resistant panels generally include an adaptive cover layer having a dynamic multifunctional, responsive functional layer, and an underlying layer comprising substantially vertically oriented flame retardant treated fibers. By way of example, the flame resistant panels can be employed in mattresses as a batting material. Advantageously, the flame resistant panels including the adaptive covering material and the vertically oriented fibers provide a low noise in use, a softness sensation to the user; and a superior ease of use as demonstrated by a high mechanical strength so as to allow reuse and high temperature laundering. Moreover, the adaptive cover layer provides improved comfort by providing dynamic thermoregulation, dynamic moisture wicking, dynamic comfort and increased performance.

Figure 1:
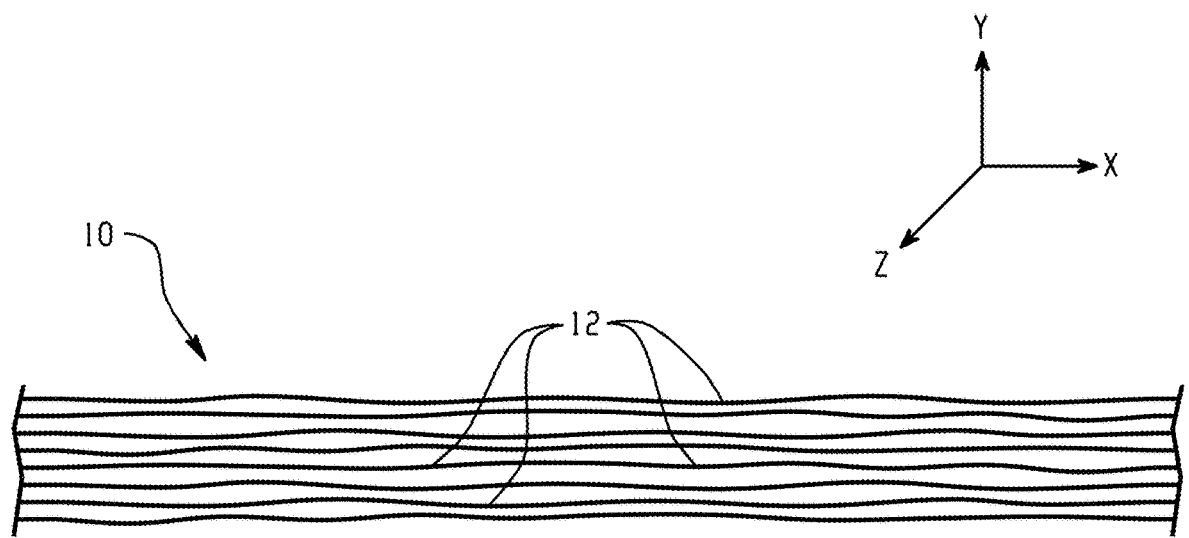
FIG. 1 illustrates a cross-sectional view of a non-woven batting material with carded and horizontally cross lapped fibers.

By orienting the fire retardant treated fibers in a substantially vertical direction, the flame resistant panel has increased resiliency and the ability to recover due primarily to the change in fiber orientation from horizontal to vertical. The increase in resiliency has been found to translate into higher levels of comfort and product durability. By use of the term "treated" it is meant that a fire retardant is applied to the fiber, wherein the fibers by themselves may have varying degrees of flame retardancy depending on the composition. Still further, increased airflow was observed by orienting the fibers in the substantially vertical direction. Three dimensional thermal imaging has confirmed that mattress assemblies configured with flame resistant batting comprising substantially vertically oriented flame retardant treated fibers exhibited less retained heat compared to conventional cross-lapped and horizontally oriented fiber layers such as that shown in Prior Art FIG. 1.

Figure 2:
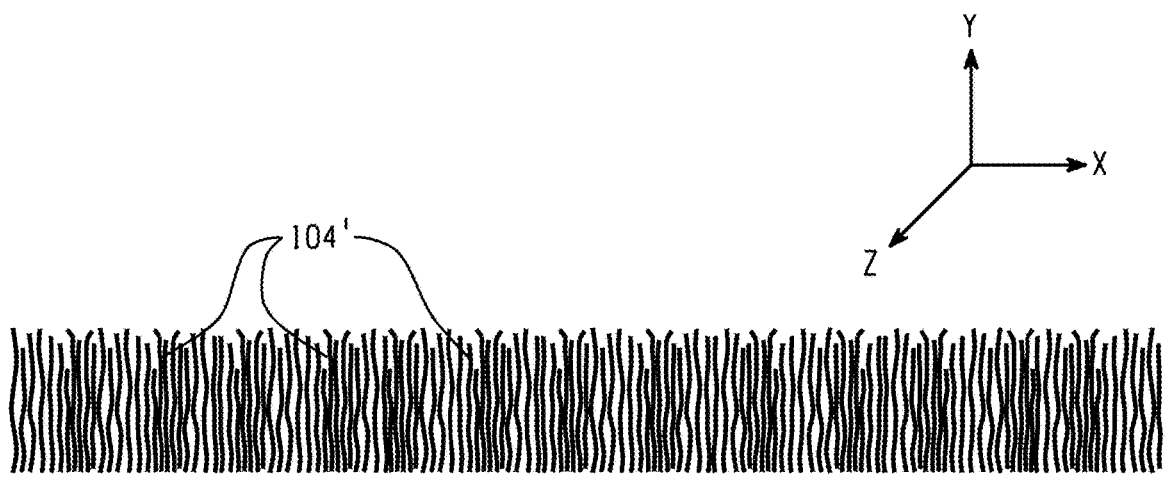
FIG. 2A illustrates a cross-sectional view of a fire resistant panel with vertically oriented flame retardant treated pleated fibers and an adaptive cover layer in accordance with the disclosure.
FIG. 2B illustrates an enlarged cross-sectional view of the fire resistant panel with vertically oriented flame retardant treated fibers of FIG. 2A in accordance with the disclosure.
Figure 2A:
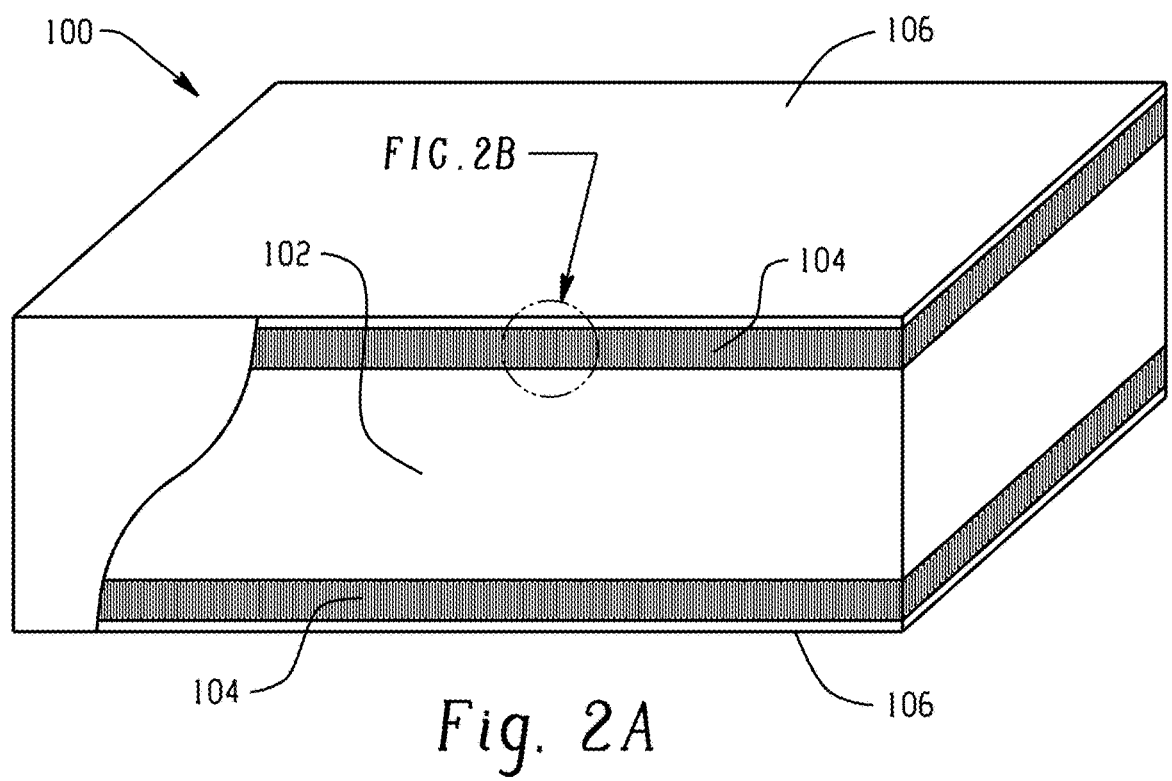
Figure 2B:
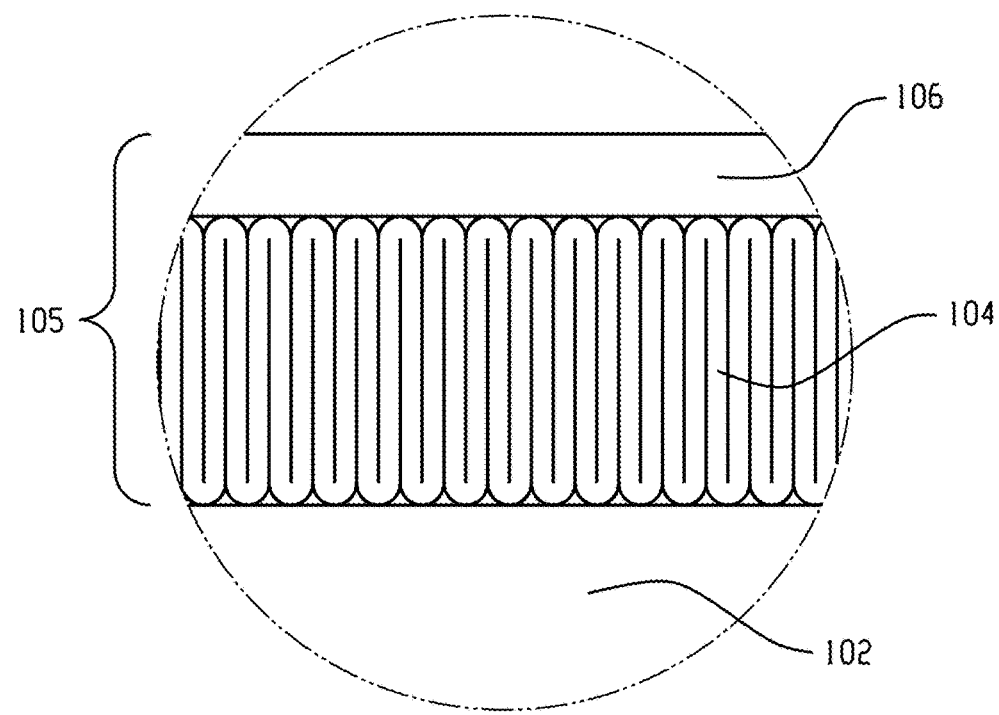

Turning now to FIGS. 2A and 2B, there is depicted an exemplary mattress 100 including a flame resistant panel 105 in accordance with an embodiment. Although reference is made to a mattress for exemplary purposes, it should be apparent that the flame resistant panels can be used in other cushioning article applications. The mattress 100 generally includes the flame resistant panel 105 surrounding a central core layer 102. The core layer 102 may comprise one or more foam layers, a coil spring layer, and various combinations thereof as is generally practiced in the art.

As shown more clearly in FIG. 2B, the flame resistant panel includes an adaptive cover layer 106 and an underlying vertically oriented fiber layer 104 (also referred to herein as a vertically oriented fiber batting material) such that the adaptive cover layer 106 defines an exterior surface for the panel, i.e., the outer face of the pleated middle upholstery layers 104. An optional bottom fabric layer may be disposed under the upholstery layer such that the vertically oriented fibers are sandwiched between the adaptive cover layer and the bottom layer.

The flame resistant panel 105 generally surrounds at least a portion of the exterior surface of the central core layer 102. For example, the flame resistant panel 105 can extend around the top and sides of the mattress, where it is shown partially cut away to reveal layers behind adaptive cover layer 106. Other layers such as an insulator layer or the like (not shown) may also be included as may be desired for different applications.

The adaptive cover layer 106 generally includes a hydrofunctional polymer applied to a fabric support surface using standard textile processing. The polymer forms a film surrounding each fiber that then can interact with the external environment through a dynamic, temperature-dependent mechanism. As will be discussed in greater detail herein, the polymer structure can be designed to reversibly retain moisture at low temperatures and release the retained moisture at higher temperatures. For example, moisture may be retained at temperatures of about 20° C. and released at relatively warmer conditions of about 30-35° C. This temperature dependence means that the covered layer 106 transports moisture differently depending on the surrounding temperature conditions. As a consequence of the hydrofunctional polymer, the adaptive cover layer 106 may provide the mattress with improved thermal regulation, improved dryness, improved thermal insulation, and/or improved fabric handle.

As it relates to thermal regulation, evaporative cooling is enhanced under the warm conditions and is moderated under cool conditions. Temperature dependent control of cooling potential enables improved thermal comfort such as is highly desirable to end users of mattresses. The excellent moisture transport properties can draw free moisture away for the skin to maintain a dryness feeling to the end user. Moreover, with regard to thermal insulation, the hydrofunctional polymer provides a thin film about the fabric fibers, thereby augmenting thermally conductive pathways for heat dissipation.

Suitable hydrofunctional polymers applied to the fabric support surface that defines the adaptive cover layer 106 are generally disclosed in U.S. Patent Publication No. 2011/0250409, incorporated herein by reference in its entirety. In one embodiment, the adaptive cover layer is configured to provide at least two different functions. Examples of such functions include, without limitation, moisture management, management, soil release, antistatic, hydrophobicity, hydrophilicity, oleophobicity, controlled-release, conductivity, and the like. The hydrofunctional polymers include responsive compounds selected to switch to a different property by an external stimulus. The responsive behavior generally means that the system change that is triggered by the external stimulus is reversible and can be repeated.

Figure 3:
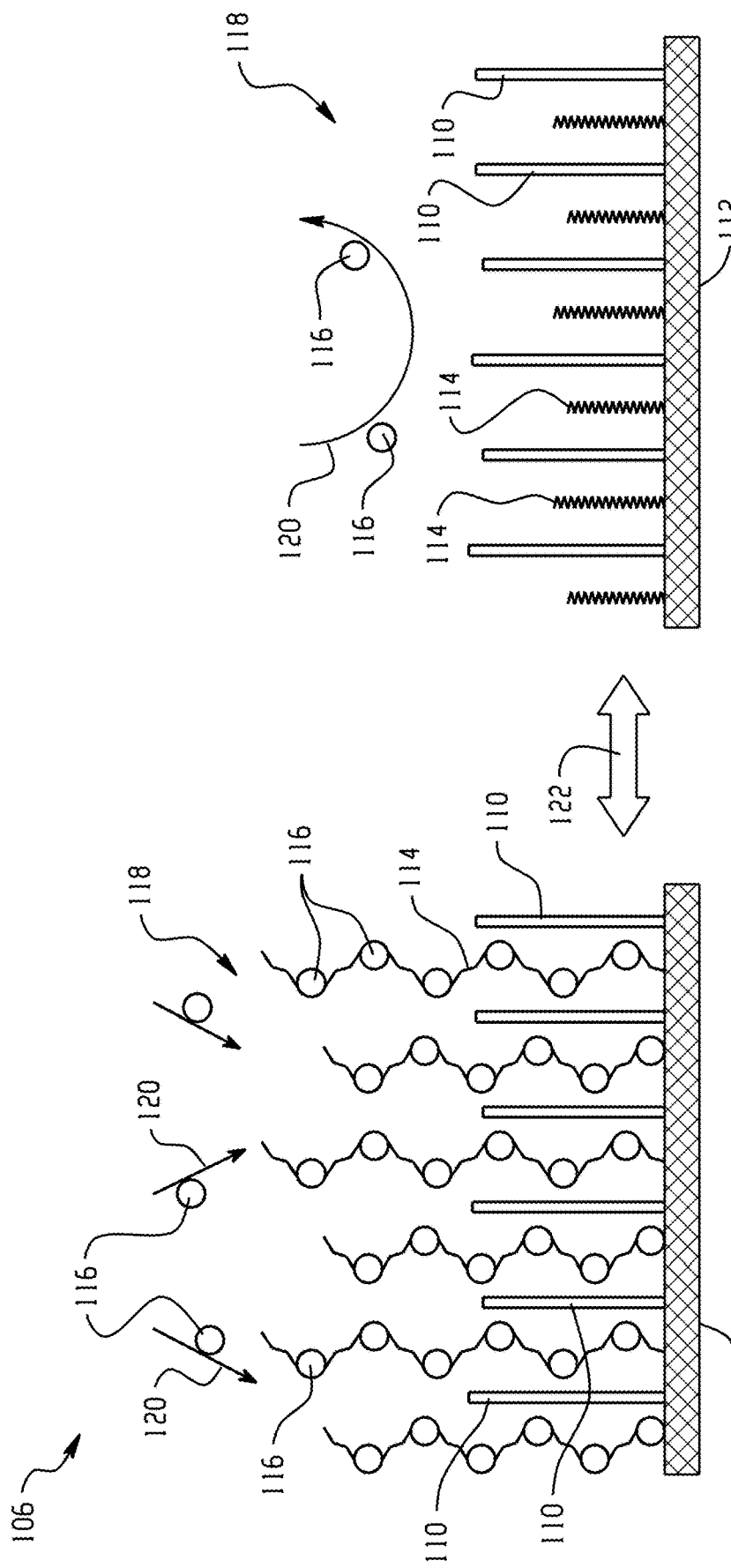
FIG. 3 schematically illustrates an adaptive cover layer in accordance with an embodiment of the present disclosure.

Turning now to FIG. 3, there is shown an exemplary adaptive cover layer 106 including a multifunctional, responsive functional layer, which generally includes two functional components, wherein one of the components can be reversibly switched by an external stimulus. A first functional component 110, which is connected to the fabric substrate 112 by physical-chemical means, is located on a substrate 112 such as a fabric layer. In addition to the first functional component 110, there is a second functional component 114, which is also connected to the substrate 112 by physical-chemical means. The second functional component 114 can include a responsive, polar polymer component on which water molecules 116 are retained at low temperatures. The first functional component 110 can include a hydrophobizing polymer. First and second functional components 110, 114, respectively, form a responsive composite functional layer 118, i.e., a finishing layer, whose responsive behavior is further explained.

In this functional layer 118, the responsive and hydrophobizing polymer components 110, 114, respectively, exist next to one another in an insulated manner based on phase separation that is selected to occur during application and attachment of the respective components While the hydrophobizing functional component 110 forms, by self-assembling, largely rigid chains for the gas phase (air), the chains of the responsive functional component 114 are greatly stretched with increasing water content, by which a hydrophilic layer dominance of the responsive composite functional layer 118 results. Water molecules 116 that are in the gas phase are stored on the responsive functional component 114, which is indicated with an arrow 120. This hydrophilic layer dominance is configured to exist at a normal temperature, e.g., for mattress applications at room temperature.

An increasing temperature produces increasing dehydration and deflation of the responsive functional polymer 114, whereby the stretched chains collapse or ball up. The formerly bonded water molecules 116 evaporate, and a new influx of water molecules 116 is considerably impeded, which is indicated with the arrow 120. In addition to the hydrophobizing functional components 110, the responsive functional polymer 114 is retracted, by which now the largely rigid chains of the functional component 110 or the hydrophobizing polymer dominate the surface of the functional layer 116.

The external stimulus is the temperature at which the hydrophilicity or the hydrophobicity of the surface of the functional layer 116 can be reversibly switched. This is indicated with a double arrow 122.

In addition, the barrier or the barrier layer is described. Bipolar monomers and polymer compounds are able to form interfacial structures, in particular membrane layers, starting from micelles and/or vesicles by self-assembling on solid or liquid surfaces. Depending on the polarity of the surface (hydrophilic or hydrophobic), on which the micelle or the vesicle spreads, the thermodynamically-induced self-assembling results in a (hydrophobic or hydrophilic) orientation that is directed vice versa relative to the air.

After the application on a fabric, for example, bipolar compounds emulsified in water and amphiphilic polymers show a property that is comparable to the micelles or vesicles. Typical examples of such compounds are specially-formulated fat-modified ($C_3$-$C_{24}$, preferably $C_8$-$C_{18}$) formaldehyde, polyacrylate and polyurethane resins as well as fluorocarbon resins ($C_2$-$C_{12}$, preferably $C_4$-$C_8$), on whose backbone, for example, acrylate or methane is also based. Additional possibilities are the use of metal salts of higher fatty acids ($C_3$-$C_{24}$, preferably $C_8$-$C_{18}$), and, for example, fatty acids ($C_3$-$C_{24}$, preferably $C_8$-$C_{18}$) that are esterified with compounds containing polysaccharides or quat groups.

Block polymers that contain both hydrophobic and hydrophilic segments represent another amphiphilic compound class. The hydrophobic segments are widely based on silicon and fluorocarbon resin, which is based on hydrophilically-preferred polyoxyethylene and polyoxypropylene. The amounts used of the above-mentioned compounds on textiles are 0.1-5%, preferably 0.2-2.0%, of the active substance, relative to the dry weight of the textile material that is to be finished. The above-mentioned compound classes are partially used for hydrophobization of textile fiber materials and fabrics. The barrier layers that are developed by self-assembling with such compounds produced on fabric surfaces for the most part meet only a finishing-specific function, namely a hydrophilization or hydrophobization of the textile material. By the attaching of the compound forming bipolar barriers (monomers and/or polymers) on solid or liquid surfaces, their possible orientation is limited by the rigidity of the molecule chains to be oriented and their proximity to the substrate. This in turn reduces the effect.

This drawback is considerably improved by the incorporation of, e.g., spacers between the substrate and the barrier layer. Such barrier layers, in particular membrane layers with 'spacers' to the substrate, are referred to as tethered membranes.

Responsive polymers are used as spacers that can be reversibly switched by external stimuli between differently formed polymer states (e.g., the stretched or balled-up form of the polymer).

Corresponding triggers that set off the switching process, described in the literature, are physical and/or chemical layer-extrinsic factors such as temperature, pH, electrical charge and humidity. As other stimuli that set off the switching process, the ionic strength of an electrolyte solution or that of the polymer surface itself can be named.

Depending on design and the object to be achieved, the responsive functional layers according to the invention can be switched by mechanical forces in the range of $10^{-7}$ newton (N) up to several newton (N), as well as by electromagnetic waves (electromagnetic radiation) of the most varied spectral ranges and intensity. As examples, the light of a specific wave range and its intensity can be mentioned.

The above-mentioned factors can occur during use of the materials that are finished with responsive functional layers, such as, e.g., washing, storing, ironing, drying, cleaning, etc. Other extrinsic stimulus-inducing situations are stress (blood pressure, perspiration, etc.), high temperatures, oil and chemical contact.

At the same time, additional functionalities can be generated by the incorporation of a spacer layer. For example, one water-storing device between the substrate and the barrier layer that is, for example, hydrophobically dominated, or one anti-static and/or microbial function are very essential.

Examples of responsive polymers are polyethylene oxide and polypropylene oxide derivatives as well as their copolymerizates, ethoxylated and propoxylated polysaccharides, polyacrylamides or polyacrylates as well as polyelectrolytes, such as, e.g., ionic polysaccharides, acrylamides or acrylates.

The amounts used in this connection are 0.05 to 5.0%, preferably 0.1 to 2.0% of the active substance, relative to the dry weight of the textile material that is to be finished.

In addition to the preferred one-stage procedure for the production of multifunctional, responsive functional layers according to the principle of the invention, a two-stage or multi-stage production method is also practicable in the acceptance of additional charges. Such a procedure is applied, for example, during the incorporation of a bi-layer structure for producing a high-level reversible water storage capacity to thereby achieve a high degree of heat regulation.

In such a case, first the responsive spacer layer is applied by an impregnating process, while the barrier-forming functional component or the functional composite is then applied on one side or two sides. As one-sided application techniques, e.g., splashing, spraying, and knife-coating are available, while two-sided application is preferably carried out by dipping.

The one-sided or two-sided barrier-layer application is oriented for the purpose of the textile material. In the case of one-sided barrier-layer application, the fabric side that is opposite the barrier layer is hydrophilic and is able to take up water as a liquid phase. In a two-sided barrier layer application, the water transport is carried out in the hydrophilically responsive functional layer primarily via the gas phase.

Figure 4:
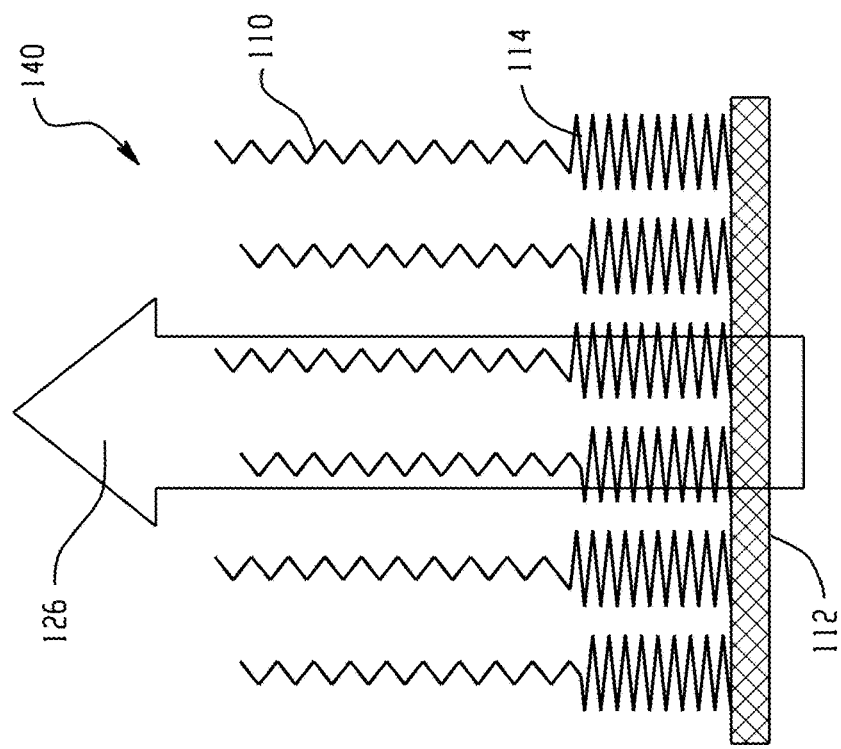
FIG. 4 schematically illustrates an adaptive cover layer in accordance with an embodiment of the present disclosure.
Figure 4:
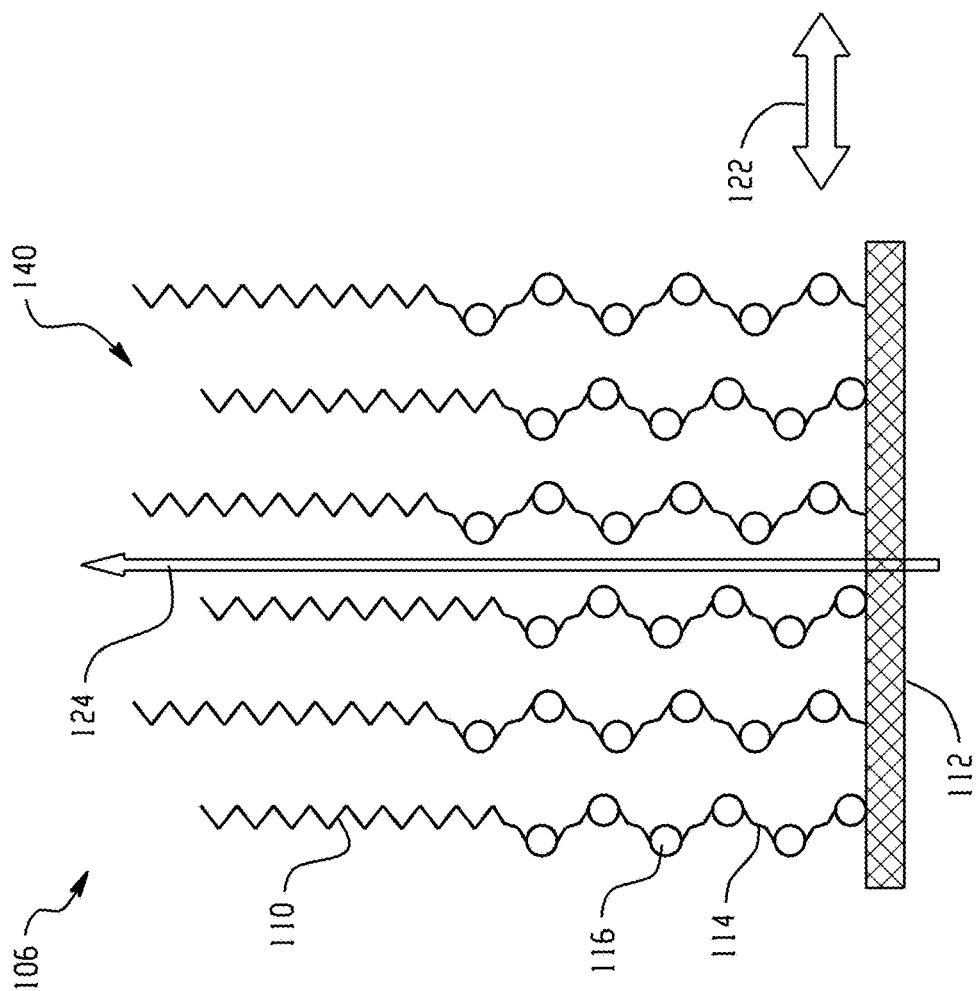

Optionally, as shown in FIG. 4, the cover layer 106 may include multifunctional, responsive functional layer with two functional components, wherein a lipophilic functional component rests on the responsive functional component and temperature forms the external stimulus. In this embodiment, the second functional component 114, which is connected to the substrate 112 by physical-chemical means and consists of a responsive, polar polymer component, on which water molecules 116 are stored, is located on the substrate 112. Here, the first functional component 110, namely a lipophilic component, is attached to the responsive polymer component by physical-chemical means. The second functional component 114 is also referred to as a spacer polymer.

First and second functional components 110, 114, respectively, form a responsive functional layer 140 or a finishing layer.

If the substrate 112 is fabric, the responsive functional layer 140 located thereon at normal temperature (no physical exertion) allows only a small transport of water, which is indicated with a narrow arrow 124. In the case of physical exertion and the associated temperature increase, the responsive functional layer 140 allows an excellent transport of water, which is indicated with a wide arrow 126.

The external stimulus is temperature, with which the hydrophilicity or the hydrophobicity of the surface of the functional layer 140 can be reversibly switched or triggered. This is in turn indicated with the double arrow 122. The functional layer 140 can also contain several first functional components 110 and several second functional components 114. It is in no way limited to an individual first and second functional component.

By the one-stage application of bipolar, barrier-forming compounds with responsive polymer compounds as spacers on textiles, functional layers for moisture transport and for heat regulation of textiles that are applied next to the body are produced according to the invention. The responsive polymer layer has the property of a water-storing device, whose storage capacity is determined by the temperature. By the use of responsive spacer polymers, the properties that are typical of this layer can be switched on or off. Especially important in this case is the temperature as a trigger, which when using responsive polymers in this connection results in the hydration or dehydration thereof. In the corresponding switching, the responsive polymer layer shows a clear and reversible change in the chain arrangement, which can vary from the stretched form to the form that is completely balled-up.

According to this example, the use of a responsive polymer that binds to water at lower body temperatures (e.g., <30° C.) and precipitates water at higher temperatures because of increasing insolubility is advantageous. Since the released water more or less quickly evaporates corresponding to the prevailing conditions and energy is removed by the evaporation enthalpy that is to be applied to the system, a cooling of the textile and thus the skin is the result.

The functional layers that are produced on two sides in this way show outwardly a hydrophobically dominated and thus dry behavior, e.g., on the skin in the case of textiles that are applied close to the body. The water that is released from the body by perspiration is primarily transported via the gas phase into the spacer layer, stored, and, depending on temperature conditions, released very quickly to the environment without a noticeable feel of moisture on the skin.

By variation of the mass ratios between the hydrophobically dominated barrier polymer and the hydrophilically dominated responsive polymer in the dispersion/emulsion applied on a substrate, a gap in mixing can result by removal of the homogeneous phase (e.g., water) during the layer attachment. Such gaps in mixing can also be formed by other stimuli, such as, e.g., electrical charges or electrolytes. Because of the mixing gaps that occur, the polar-dominated amphiphilic polymer forms water-transporting polymer bridges, comparable to the transmembrane proteins in biological membranes.

Another special feature of this functional layer according to the invention is the hydrophobicity that dominates in the low to average relative air humidity (≤80%), which means an extreme water-repellent property, and the hydrophilicity that increases at higher relative humidity (>80%), which means an excellent washability of dirt. By the incorporation of micro- and/or nanoparticles in the functional layer or in the composite, responsive self-cleaning surfaces can be produced.

Both in the described application and in the following application, lotus-effect layers and petal-effect layers are inherently present, whereby the humidity or the corresponding water content of the functional layer is the trigger for switching the respective function. Soil-release functional layers, based on this principle, show high effect levels.

Another application of this principle is that of a water collector. In this case, for example, the hydrophilically-dominated responsive polymer is immobilized on several μm size particles (e.g., $SiO_2$) and dispersed into water together with the hydrophobic membrane polymer and corresponding dispersing agents. By the drying that is carried out after the application, a phase separation occurs with the formation of hydrophilic condensation nuclei. The latter are able to sorb water from the gas phase with decreasing ambient temperature on one side (top side) of the textile material and to transport to the rear side as a liquid phase by the bridges that are present because of the phase separation from polar polymer associates or also to allow flow-off on the top side of the fabric. Here, it results in drop formation and can be further used, for example, as drinking water. With increasing temperature, the responsive polymer is again dehydrated, with the degeneration of the hydrophobic domain. Sample applications are camping, watering of crops, and use as military survival equipment.

Figure 5:
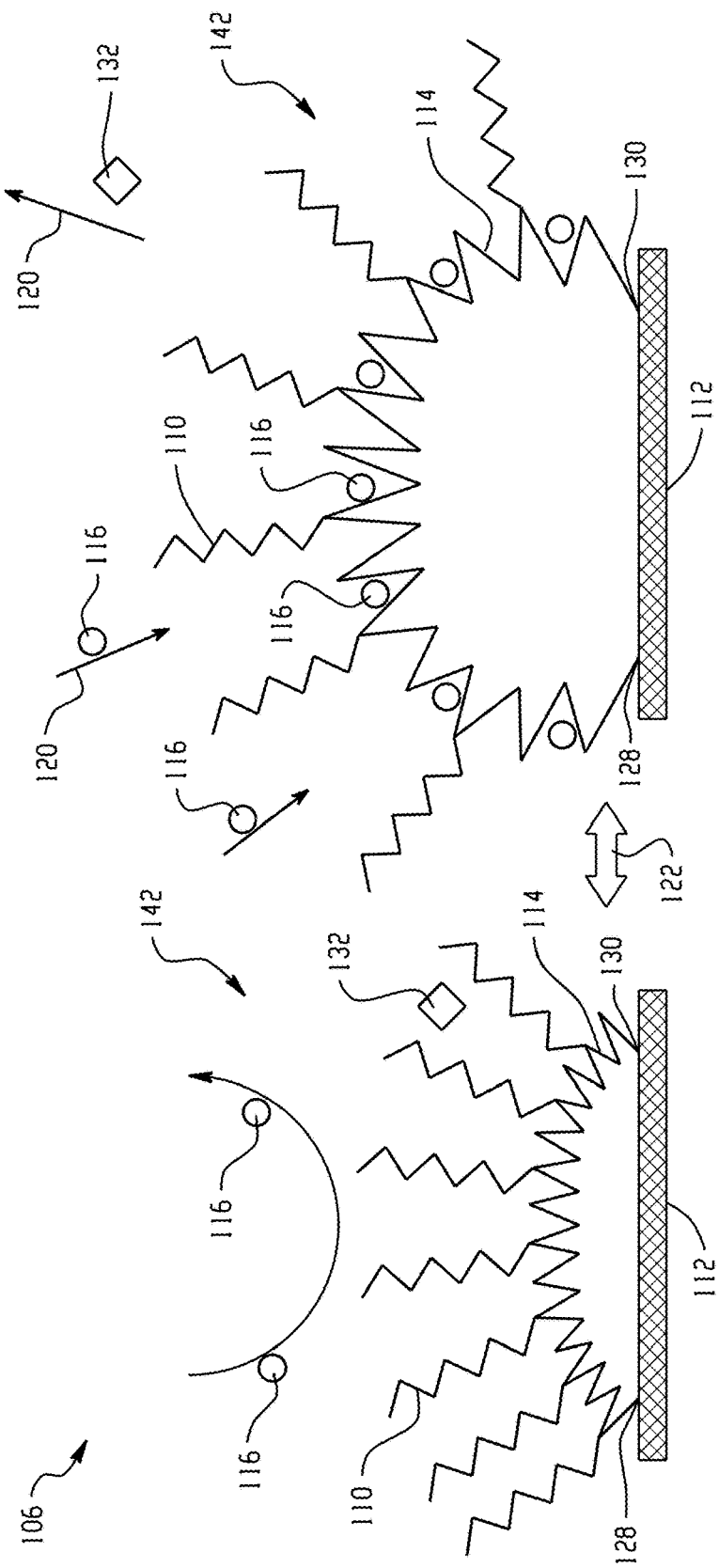
FIG. 5 schematically illustrates an adaptive cover layer in accordance with an embodiment of the present disclosure.
Figure 6A:
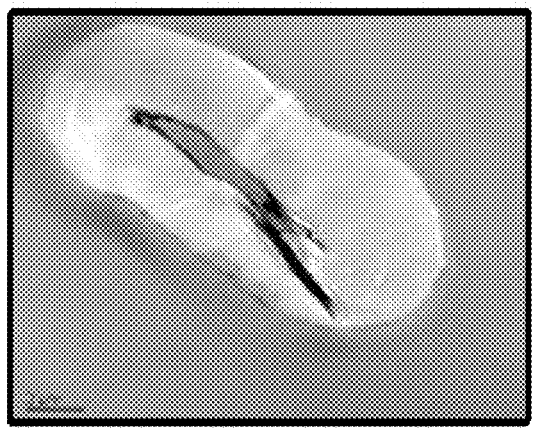
FIG. 6A depicts a cross section of a cotton fiber after immersion in dyed water, wherein lighter regions indicate minimal moisture absorption and darker regions indicate maximum moisture absorption.
Figure 6B:
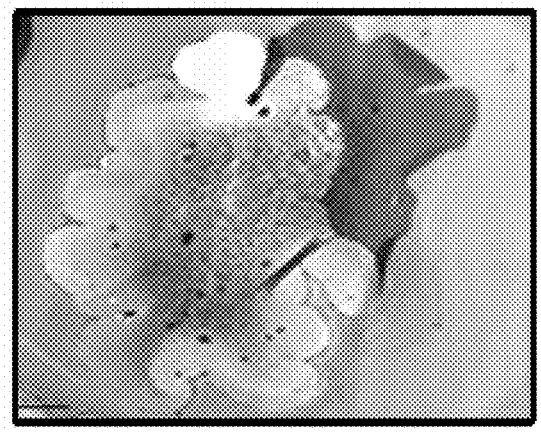
FIG. 6B depicts a cross section of a viscose fiber after immersion in dyed water, wherein lighter regions indicate minimal moisture absorption and darker regions indicate maximum moisture absorption.
Figure 6C:
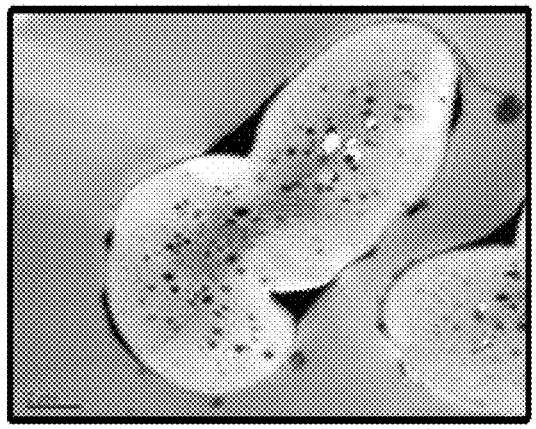
FIG. 6C depicts a cross section of a modal fiber after immersion in dyed water, wherein lighter regions indicate minimal moisture absorption and darker regions indicate maximum moisture absorption.
Figure 6D:
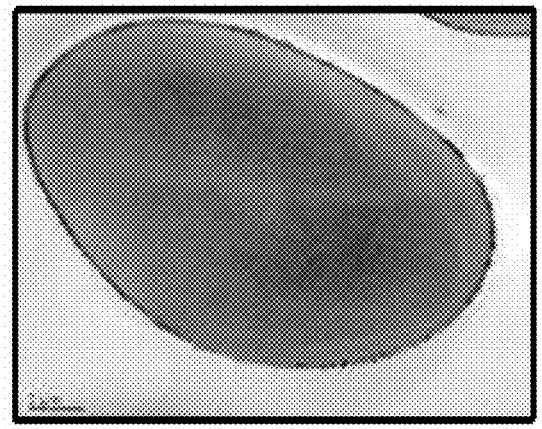
FIG. 6D depicts a cross section of a lyocell fiber after immersion in dyed water, wherein lighter regions indicate minimal moisture absorption and darker regions indicate maximum moisture absorption.
Figure 7:
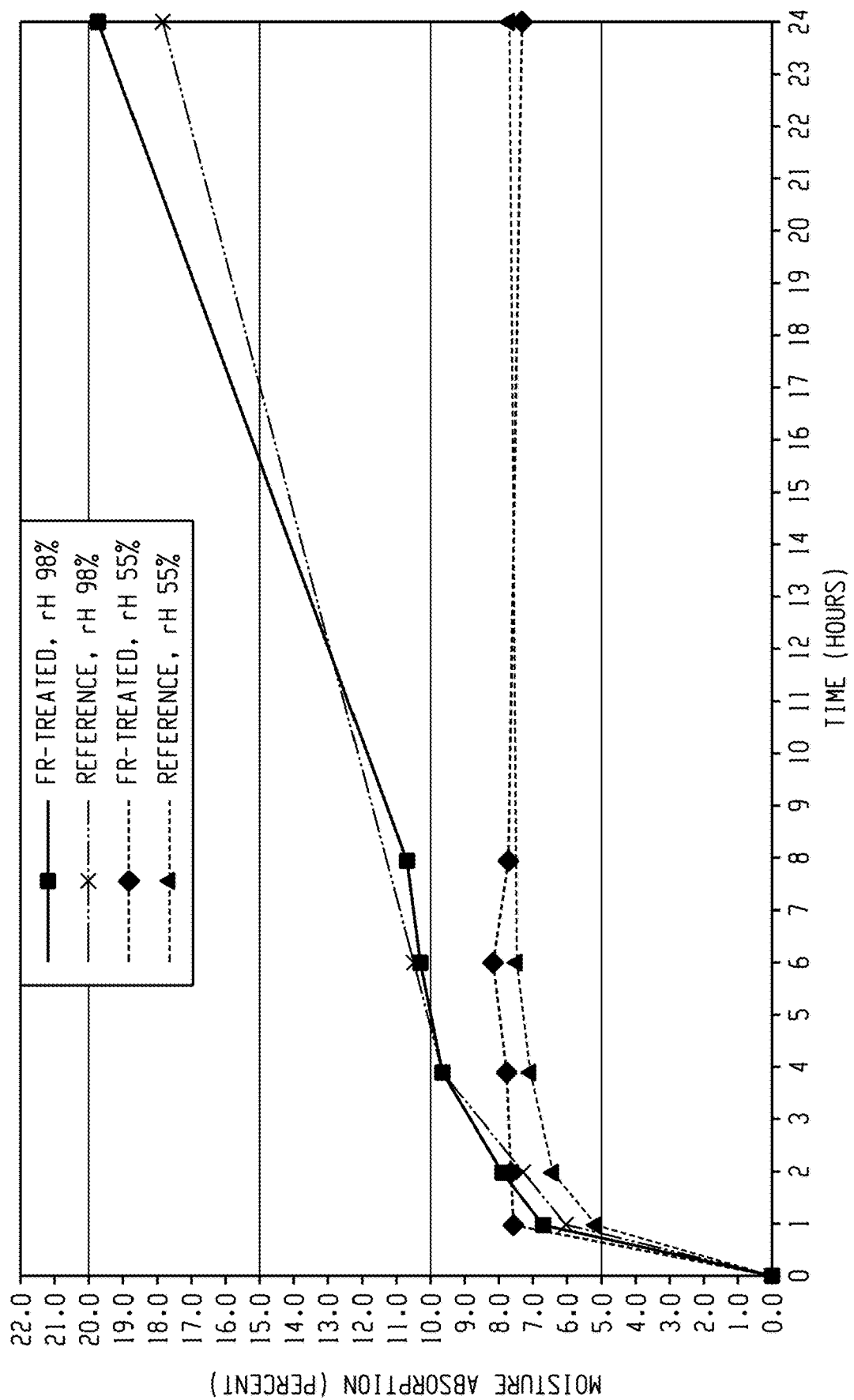
FIG. 7 schematically illustrates an adaptive cover layer in accordance with an embodiment of the present disclosure.

FIG. 5 depicts an alternative embodiment of the cover layer. The multifunctional, responsive functional layer includes two functional components, whereby the lipophilic functional component rests on the responsive functional component, and the moisture content forms the external stimulus.

In this embodiment, the second functional component 114, which is connected to the substrate 112 by physical-chemical means only at the two points 128, 130, is located on the substrate 112. The second functional component 114 includes a responsive, polar polymer component as a spacer layer. Here, the first functional component 110, namely a hydrophilic component, is attached to the responsive polymer component by physical-chemical means. First and second functional components 110, 114, respectively, form a responsive functional layer 142 or a finishing layer, e.g., a soil-release functional layer.

The responsive functional layer 142 is water-repellent at a low moisture content, which is indicated with the water molecule 116 and with the arrow 120. Any contamination 132 or dirt particles adhere to the hydrophobic surface of the functional layer 142.

A swelling or stretching of the spacer polymer 114 occurs by the water absorption of the responsive polymer and the pH that is preferably adjusted to be weakly alkaline. Consequently, the distance of the first functional component 110 or the hydrophobic chains attached thereto opens up. As a result, the influx of water is made possible, which is indicated with the water molecule 116 and with the arrow 120. As a result, the purification effect of the functional layer 142 and thus the substrate 112 from any contamination 132 is made possible, which is indicated with an arrow 134.

The external stimulus is the moisture content of the functional layer 118, which can be reversibly switched or triggered with the washing process or the drying. This is in turn indicated with the double arrow 122.

The 'soil-release' function is composed of two opposite functions. On the one hand, this is the dirt-shedding function, and, on the other hand, this is the best possible washability of once-contaminated surfaces. The principle for implementing the two functions consists in the application of a hydrophobic membrane-forming polymer in combination with a hydrophilically-dominated responsive polymer. By the application of specially modified cellulose derivatives as spacer-polymers, the latter is present with low humidity in balled-up, more or less unswollen form. In the presence of water, for example during the washing process, an influx of water can be detected by existing flaws in the barrier layer, which has the result of a considerable swelling of the spacer layer and thus also an opening of the membrane layer. As a trigger for inducing the responsive effect, in this case the increased water content of the spacer layer is used.

The spacer layer is not necessarily a responsive polymer layer; thus, at least a first functional component can also be designed as a spacer layer, for example as a lipophilic functional component.

As polymers that form barrier layers, preferably fluorocarbon resins with $C_4$-$C_{12}$ chains are used, and as responsive polymers, polyelectrolytes, such as, e.g., carboxylated polysaccharides and/or acrylic acid derivatives, are used. The amount of barrier-layer-forming compounds used is 0.1-3.0%, preferably 0.2-1.5%, and that of the responsive polymer is 0.05-5.0%, preferably 0.1-2.0%, of the active ingredient, relative to the dry weight of the textile material that is to be finished.

The responsive property of a corresponding spacer-polymer can also be used to achieve a high level of oil and gasoline shedding from, e.g., protective clothing. The high level of oil and gasoline shedding in the case of protective suits for the police, firefighters and military has special importance since in the case of corresponding uses, the risk of fire is the greatest threat. While oil or gasoline that has penetrated the unswollen spacer-polymer once can be distributed in an unimpeded manner, the swollen spacer polymer forms a second barrier layer that is impermeable to oil and gasoline. The swelling of the responsive spacer layer is already carried out by human perspiration, by which in this case, the relative air humidity of the climate that is close to the body is the stimulus for the creation of the desired function. This behavior can be repeated as often as desired after a protective suit is dried.

In addition to the barrier-forming components and the responsive polymer components, a functional layer according to the invention contains additional ingredients and thus forms a multifunctional composite.

Cross-linking agents: As cross-linking agents, formaldehyde resins, in particular melamine and ethylene urea derivatives, such as, e.g., Knittex FEL (Huntsman), free and blocked isocyanates, such as, e.g., phobol XAN (Huntsman), aziridine compounds, such as, e.g., XAMA 7 (flevo chemistry) and multifunctional glycidyl compounds, such as, e.g., Isobond GE 100 (Isochem) are used. The amounts used, depending on mass, vary as a function of molecular weight and reaction group content of the cross-linking agent in the range of 0.05-1.5%, preferably 0.1-0.5%, of the active substance, relative to the dry weight of the textile material that is to be finished.

Catalysts: The catalysts are to be selected specific to the reaction system. In the case of formaldehyde resins, but also when using glycidyl compounds, metal salts and preferably carboxylic acids are used. Typical catalysts for formaldehyde resins are magnesium chloride, aluminum chlorohydrate, citric acid, and tartaric acid. The amounts of metal salts used in the liquor are 1-25 g/l, preferably 5-15 g/l. The acid concentrations that are to be adjusted in the liquors are in the range of 0.1-10 g/l, preferably 0.5-4 g/l.

When using isocyanates but also amines attained from glycidyl compounds, preferably tertiary amines, such as, e.g., 1,4-diazabicyclo(2,2,2)octane (DABCO), triethanolamine, 1,2-dimethylimidazole and benzyldimethylamine (BDMA), are used. The amounts used are 0.5-15 g/l, preferably 2-10 g/l.

As noted above, the pleated middle upholstery layers 104 comprise a pleated (vertically lapped and oriented) web of cross-laid fibers. In the pleated layer, the pleats are formed from a cross-laid non-woven web of fibers as will be described in greater detail below.

In an alternative embodiment, the non-woven fiber batting material for the middle upholstery layer 104' can include a plurality of individual flame retardant treated fibers 102 substantially oriented in a vertical direction, i.e., generally transverse (y-direction) to a horizontal plane (x-direction) of the batting material.

The term "non-woven" as used herein in connection with fabrics, fibrous compositions, textiles, materials, products and similar items means a structure that is produced by attaching, bonding and/or interlocking two or more of the same or different components, such as filaments, microfibers, fibers, fibrous compositions, threads or yarns, together, generally by loosely bonding them together, and using one or more of a variety of techniques that generally does not involve weaving or interlacing, but employs mechanical, chemical, thermal and/or solvent means, for example, using known needle punching, melt-blowing, spun bonding, wet-forming and various bonded carded web processes. Non-woven materials may be manufactured using fusing or chemical bonding techniques (with the use of binding agents, such as PVA or polyester) or similar techniques, which are known by those of skill in the art. This term generally does not include fabrics, textiles, fibrous compositions or materials that are woven, knitted, tufted, or those made using wool or other felting processes.

The upholstery layer, i.e., batting material, including the flame retardant treated fiber in the substantially vertically oriented orientation of the present disclosure is cost effective, soft, yet durable and suitable for various cushioning articles including, but not limited to a mattress component, mattress covers, comforters, bedspreads, quilts, coverlets, duvets, pillows, pillow covers, cushions, in addition to other home uses, protective apparel applications, and industrial end-use applications.

The fibers employed in the vertically oriented flame retardant treated fiber batting material are not intended to be limited so long as a fire retardant can be applied and retained in an amount effective to provide the panel with a fire resistance that meets or exceeds 16 C.F.R. Part 1633. The fibers can be natural fibers and/or synthetic fibers. The use of natural fibers in bedding components is desirable due to the softness and durability associated with these fibers as well as the absorption properties of most natural cellulosic fibers. Suitable fibers include, without limitation, polyester, polyolefins such as a polypropylene and polyethylene, cellulosic fibers, cotton, rayon, wool, silk, acetate, nylon, lyocell, flax, ramie, jute, angora, kenaf, and the like, and mixtures thereof.

The fibers may have varying diameter and denier, be hollow or solid, or may be crimped. Blending different types of fibers may further contribute to resiliency of the batting material. The amounts will vary generally depending on the fiber composition, and flame retardant employed.

In one embodiment, the flame retardant treated fiber is lyocell, which is a regenerated cellulose fiber made from dissolving pulp (bleached wood pulp) and is commercially available as fibers under the brand name Tencel from Lenzing AG. The US Federal Trade commission defines lyocell as "a cellulose fiber that is obtained by an organic solvent spinning process" and classifies the lyocell fiber as a subcategory of rayon. Some main characteristics of lyocell fibers are that they are soft, absorbent, very strong when wet or dry, and resistant to wrinkles; all of which are generally desirable for a batting material. The moisture absorption properties provide improved moisture wicking, which is highly desirable for mattress applications.

FIGS. 6A-6D depict cross sections of various cellulosic fibers after immersion in dyed water, wherein lighter regions indicate minimal moisture absorption and darker regions indicate maximum moisture absorption. The various cellulosic fibers included cotton, a rayon commercially available under the trademark VISCOSE from the Lenzing Group, a modified rayon commercially available under the trademark MODAL from the Lenzing Group; and lyocell commercially available under the trademark TENCEL from the Lenzing Group. As shown, lyocell exhibited the greatest and most uniform moisture absorption as evidenced by the uniform dark color throughout the cross section. In contrast, moisture absorption for the MODAL and VISCOSE materials was observed to be confined to pores within the cross-sectional structure whereas moisture absorption in cotton was in centrally located pore. It is further noted that lyocell had a relatively smooth outer surface compared to VISCOSE and MODAL, which is believed to result in improved carding and provide a softer touch relative to materials having complex cross-sectional shapes.

Man-made fibers can be produced to any desired cut length, which is generally determined by the equipment and product performance. For the vertically oriented batting material, the fibers to be fire retardant treated generally have a length of 0.25 to 4 inches; in other examples, a length of 0.5 to 3 inches, and in still other examples, a length of 1.5 to 3 inches. By way of example, for lyocell, rayon and/or polyester fibers, the cut lengths for carding are generally between 1.5 and 3 inches. For natural fibers such as cotton, the fiber length can generally vary from 0.5 to 1.6 inches. The non-woven fiber batting material when vertically oriented can also have a total thickness or loft of 0.5 inches (1.25 centimeters) or greater. While there is no real limitation on how thick the batting can be, for many typical applications, the thickness of the high loft batting need not be higher than 3 inches (7.6 cm), and for many mattress applications less than 2 inches (5 cm) is useful. The flame resistant panels can also generally have a basis weight of about 5 to 18 ounces per square yard (169 to 610 grams per square meter) and are preferably 8 to 11 ounces per square yard (271 to 373 grams per square meter). The total density of the batting material is generally aligned with the basis weights described above. Denser battings generally do not have the resiliency desired for use as cushioning in mattresses and other articles. As for battings that are less dense, the batting materials are oftentimes bulky to handle during fabrication and are generally compressed into the preferred density range when incorporated into a quilted composite. Thinner and denser battings also do not provide the desired softness, aesthetics, and may lack durability in application and with FR protection.

The fire retardant treated fibers may be chemically, thermally or mechanically bonded to improve structural integrity. Chemical binders can generally be applied to the flame retardant treated fibers by impregnating, coating and/or spraying. Exemplary chemical binders include, without limitation, acrylate polymers, styrene-butadiene copolymers, and vinyl acetate polymers. Thermally bonded fibers generally include the addition of low melting polymeric materials, e.g., low molecular weight polyester fibers, to the flame retardant treated fibers, wherein further processing to form the web results in melting and/or partial melting of the low molecular weight binder so as to form bonds under controlled heating between the fibers of the batting material. As for mechanical bonding, a web of fibers including the flame retardant treated fibers can be processed to increase fiber entanglement. There are generally two types of mechanical bonding: needle punching and hydro-entanglement. Needle punching can be used on most fiber types and generally includes the use of specially designed needles that are pushed and pulled through the web to entangle the fibers. Webs of different characteristics can be needled together to produce a gradation of properties difficult to achieve by other means. Hydro-entanglement employs water jets to effect entanglement.

The flame resistant panels made using treated fire retardant fibers are comprised of a blend in an amount that meets and/or exceeds the flammability standards set forth in 16 CFR 1633. Flame resistance generally depends on the fiber composition, flame retardant chemical that is applied, and the flame retardant loadings. In most embodiments, at least 50% of the fibers are fire retardant treated fibers. In other embodiments, at least 60% of the fibers are fire retardant treated fibers; and in still other embodiments, at least 80% of the fibers are fire retardant treated fibers. The remaining fibers in the panel composition can comprise untreated fibers, binder fibers, and the like.

In some embodiments, multiple layers of vertically oriented fibers are stackedly arranged to provide a desired thickness for the batting material application. The stacked layers may be subjected to chemical, thermal and/or mechanical bonding to provide the desired amount of structural integrity between layers. For example, a binder such as a low molecular weight polyester and/or adhesive may be used intermediate the layers to provide structural integrity or the stacked arrangement may be needle punched to effect fiber entanglement.

Unexpectedly, it has also been discovered that when converted into a vertically oriented product using the treated fibers such lyocell or rayon, less flame retardant treated fibers are required to form the panel and provide an equivalent fire rating compared to prior art carded and cross-lapped horizontally oriented materials having a similar loft. For example, a fiber batting material at a density of 1 ounce per square foot that met and/or exceeded the product safety standard codified in 16 C.F.R PART 1633 required only 70% of substantially vertically oriented fire retardant fibers compared to 80% required for fire retardant treated fibers that had been horizontally oriented and cross-lapped as shown in Table 1.

TABLE 1

| COMPONENT | LOFT (inches) | HORIZONTAL TEMPURATURE (° F.) | CHAR FORCE (lbs.) | CHAR ELONGATION (inches) |
|---|---|---|---|---|
| Horizontally Oriented 80% Fire Retardant Treated Rayon[1] | 0.81 | 563 | 1.08 | 0.33 |
| Vertically Oriented 70% Fire Retardant Treated Lyocell[2] | 0.78 | 602 | 1.11 | 0.51 |

[1]Comparative
[2]Inventive

It has further been discovered that an ammonium polyphosphate fire retardant treated lyocell fiber batting material at a density of 0.8 ounces per square foot also met and/or exceeded the product safety standard codified in 16 C.F.R Part 1633 required, which represents a significant and unexpected result compared to prior art batting materials. As noted above, the prior art batting materials generally needed 80% fire retardant treated fibers at a density of 1 ounce per square foot to meet this codified standard whereas the data provided in Table 2 below indicates that only 70% of substantially vertically oriented fire retardant fibers at density of 0.8 ounce per square foot was needed to meet the product safety standard. The results provide a significant commercial advantage since less basis weight and materials are needed to meet the standards provided in 16 C.F.R 1633. The data further suggests that even lower percentages of flame retardant treated fibers and/or lower basis weights may be possible and still meet the product safety standard codified in 16 C.F.R Part 1633.

TABLE 2

| Vertical Fiber | Peak Heat Release Rate (kilowatts) | Time to Peak Heat (minutes) | Total Heat in 10 minutes (mega joules) |
|---|---|---|---|
| Test 1 | 40 | 0.5 | 6.6 |
| Test 2 | 40 | 0.5 | 6.4 |
| Test 3 | 38 | 0.5 | 5.0 |

Moreover, it has been discovered that unlike most conventional fire retardant fibers, application of a fire retardant chemical permeates substantially throughout the cross sectional area of the lyocell fiber, which, without being bound by theory, attributes to lower amounts of flame retardant treated fibers required in the product blend to meet and/or exceed flammability standards described in 16 CFR Part 1633.

At least a portion of the fibers are treated with flame retardant chemistry, which may be provided as a durable or a non-durable finish. Durable flame retardant finishes are not removed by exposure to water or handling. Exemplary fire retardants include, without limitation, chlorinated flame retardant compounds, such as chlorinated hydrocarbons, chlorinated phosphate esters, chlorinated polyphosphates, chlorinated organic phosphonates, chloroalkyl phosphates, polychlorinated biphenyls, polychlorinated dibenzo-p-dioxins and dibenzofurans are molecules containing a high concentration of chlorine that generally act chemically in the gas phase. They are often used in combination with antimony trioxide and/or zinc borate as a synergist. Three main families of chlorinated compounds include: (a) chlorinated paraffins; (b) chlorinated alkyl phosphates; and (c) chlorinated cycloaliphatic compounds.

Examples of chlorinated compounds include dodecachlorodimethanodibe-nzocyclooctane, tris(2-chloroethyl)phosphate, tris(2-chloro-1-methylethyl)phosphate, tris(2-chloro-1-(chloromethyl)ethyl)p-hosphate(TDPP), tris(chloropropyl)phosphate, tris(dichloropropyl)phosphat-e, tris(2-chloroethyl)phosphite, ammonium chloride, chlorendic acid, chlorendic anhydride, tris(dichlorobropropyl)phosphite, Bis(hexachlorocyclopentadieno)cyclo-octane, tris(dichloropropyl)phosphite, bis[bis(2-chloroethoxy)-phosphinyl]isop-ropylchloro-ethyl phosphate and MIREX® (1,1a,2,2,3,3a,4,5,5,5a,5b,6-dodecac-chloroocta-hydro-1,3, 4-metheno-1H-cyclobuta(cd)pentalene).

Brominated fire retardant compounds, such as brominated organic compounds and brominated hydrocarbons, exhibit fire retardant efficiency in many materials. The three main families of brominated fire retardants include: (a) aliphatic brominated compounds; (b) aromatic brominated compounds; and (c) brominated epoxy fire retardants. Aliphatic brominated compounds include, for example, trisbromoneopentylphosphate, trisbromoneopentyl alcohol, dibromoneopentyl glycol, hexabromocyclohexane, hexabromocyclododecane, tetrabromo cyclopentane, hexabromo cyclohexane, hexabromo cyclooctane, hexabromo cyclodecane and hexabromo cyclododecane. Aromatic brominated compounds include, for example, hexabromo benzene, decabromobiphenyl, octabromodiphenyl oxide, hexabromobenzene, tris (tribromophenyl)triazine, tetrabromobisphenolA bis(2,3 dibromo propyl ether), dibromoneopentyl glycol, poly (pentabromobenzyl acrylate), pentabromodiphenyl ether, octabromodiphenyl oxide, octabromodiphenyl ether, decabromodiphenyl, decabromodiphenyl ethane, decabromodiphenyl oxide, decabromodiphenyl ether, tetrabromobisphenol A and brominated trimethylphenyl indan. Brominated epoxy fire retardants include brominated epoxy oligomers and polymers.

Other brominated fire retardant compounds include brominated diphenyl ethers, polybrominated diphenyl ethers, dimethyl-3-(hydroxymethyl-lamino) -3-oxopropyl phosphonate, pentabromo toluene, tetrabromo chlorotoluene, pentabromo phenol, tribromo aniline, dibromobenzoic acid, pentabromotoluene, decabromodiphenyl oxide, tribromophenol, hexabromocyclododecane, brominated phosphorous, ammonium bromide, decabromobiphenyl oxide, pentabromobiphenyl oxide, decabromobiphenyl ether, 2,3-dibromopropanol, octabromodiphenyl ether, octabromodiphenyl oxide, tetrabromobiphenyl ether, hexabromocyclododecane, bis(tetrabromophthalimido) ethane, bis (tribromophenoxy)ethane, brominated polystyrene, brominated epoxy oligomer, polypentabromobenzyl acrylate, tetrabromobisphenol compounds, dibromopropylacrylate, dibromohexachlorocyclopentadienocyclooctane, N.sup.1-ethyl(bis)dibromonon-boranedicarboximide, decabromodiphenyloxide, decabromodiphenyl, hexabromocyclohexane, hexabromocyclododecane, tetrabromo bisphenol A, tetrabrombisphenol S,N'N'-ethylbis(dibromononbomene) dicarboximide, hexachlorocyclopentadieno-dibromocyclooctane, tetrabromodipenta-erythrito-1, pentabromoethylbenzene, decabromodiphenyl ether, tetrabromophthalic anhydride, hexabromobiphenyl, octabromobiphenyl, pentabromophenyl benzoate, bis-(2,3-dibromo-1-propyl)phthalate, tris(2,3-dibromopropyl)phosphate, N,N'-ethylene-bis-(tetrabromophthalimide), tetrabromophthalic acid diol [2-hydroxypropyl-oxy-2-2-hydroxyethylethyl-tetrabromophthalate]-, polybrominated biphenyls, tetrabromobisphenol A, tris(2,3-dibromopropyl)phosphate, tris(2-chloroethyl)phosphite, tris(dichlorobromopropyl)phosphite, diethyl phosphite, dicyandiamide pyrophosphate, triphenyl phosphite, ammonium dimethyl phosphate, bis(2,3-dibromopropyl)phosphate, vinylbromide, polypentabromobenzyl acrylate, decabromodiphenyl oxide, pentabromodiphenyl oxide, 2,3-dibromopropanol, octabromodiphenyl oxide, polybrominated dibenzo-p-dioxins, dibenzofurans and bromo-chlorinate paraffins.

Phosphorous-based fire retardants are compounds that include phosphorous, such as halogenated phosphates (chlorinated phosphates, brominated phosphates and the like), non-halogenated phosphates, triphenyl phosphates, phosphate esters, polyols, phosphonium derivatives, phosphonates, phosphoric acid esters and phosphate esters, which are the largest class of phosphorous flame retardant compounds. Phosphorous-based fire retardants are usually composed of a phosphate core to which is bonded alkyl (generally straight chain) or aryl (aromatic ring) groups. Halogenated phosphate compounds are often introduced to decrease total halogen concentration. Non-halogenated phosphate compounds include, for example, red phosphorous, inorganic phosphates, insoluble ammonium phosphate, ammonium polyphosphate, ammonium urea polyphosphate, ammonium orthophosphate, ammonium carbonate phosphate, ammonium urea phosphate, diammonium phosphate, ammonium melamine phosphate, diethylenediamine polyphosphate, dicyandiamide polyphosphate, polyphosphate, urea phosphate, melamine pyrophosphate, melamine orthophosphate, melamine salt of boron-polyphosphate, melamine salt of dimethyl methyl phosphonate, melamine salt of dimethyl hydrogen phosphite, ammonium salt of boronpolyphosphate, urea salt of dimethyl methyl phosphonate, organophosphates, phosphonates and phosphine oxide. Phosphate esters include, for example, trialkyl derivatives, such as triethyl phosphate and trioctyl phosphate, triaryl derivatives, such as triphenyl phosphate, and aryl-alkyl derivatives, such as 2-ethylhexyl-diphenyl phosphate.

Other examples of phosphorous-based fire retardants include methylamine boron-phosphate, cyanuramide phosphate, cresyl diphenyl phosphate, tris(1-chloro-2-propyl) phosphate, tris(2-chloroethyl)phosphate, tris(2,3-dibromopropyl)phosphate, triphenyl phosphate, magnesium phosphate, tricresyl phosphate, hexachlorocyclopentadiene, isopropyl triphenyl phosphate, tricresol phosphate, ethanolamine dimethyl phosphate, cyclic phosphonate ester, monoammonium phosphate and diammonium phosphate, which permit a char formation as a result of esterification of hydroxyl groups with the phosphoric acid, trialkyl phosphates and phosphonates, such as triethyl phosphate and dimethyl, aryl phosphates, such as triaryl phosphates, isopropyl triphenyl phosphate, octylphenyl phosphate, triphenylphosphate, ammonium phosphates, such as ammonium phosphate, ammonium polyphosphate and potassium ammonium phosphate, cyanuramide phosphate, aniline phosphate, trimethylphosphoramide, tris(1-aziridinyl)phosphine oxide, triethylphosphate, Bis(5,5-dimethyl-2-thiono-1,3,2-dioxaphosphorinamyl)oxide, Bis(2-chloroethyl)vinyl phosphate, dimethylphosphono-N-hydroxyme-thyl -3-propionamide, tris(chloropropyl)phosphate, tris(2-butoxyethyl) phosphate, tris(2-chloroethyl)phosphate, tris(2-ethylhexyl) phosphate, tris(chloropropyl)phosphate, tetrakis (hydroxymethyl)phosphonium salts, such as tetrakis (hydroxymethyl)phosphonium chloride and tetrakis (hydroxymethyl)phosphonium sulfate, n-hydroxymethyl-3-(dimethylphosphono-)-propionamide, urea phosphate, melamine pyrophosphate, a melamine salt of boron-polyphosphate, an ammonium salt of boron-polyphosphate, dicyandiamide pyrophosphate, triphenyl phosphite, ammonium dimethyl phosphate, fyroltex HP, melamine orthophosphate, ammonium urea phosphate, ammonium melamine phosphate, a urea salt of dimethyl methyl phosphonate, a melamine salt of dimethyl methyl phosphonate, a melamine salt of dimethyl hydrogen phosphite, polychlorinated biphenyls, a variety of alkyl diaryl phosphates and mixtures of monomeric chloroethyl phosphonates and high boiling phosphonates.

Metal hydroxide fire retardants include inorganic hydroxides, such as aluminum hydroxide, magnesium hydroxide, aluminum trihydroxide (ATH) and hydroxycarbonate.

Melamine-based fire retardants are a family of non-halogenated flame retardants that include three chemical groups: (a) melamine(2,4,6-triamino-1,3,5triazine); (b) melamine derivatives (including salts with organic or inorganic acids, such as boric acid, cyanuric acid, phosphoric acid or pyro/poly-phosphoric acid); and (c) melamine homologues. Melamine derivatives include, for example, melamine cyanurate (a salt of melamine and cyanuric acid)), melamine-mono-phosphate (a salt of melamine and phosphoric acid), melamine pyrophosphate and melamine polyphosphate. Melamine homologues include melam (1,3,5-triazin-2,4,6-tri-amine-n-(4,6-diamino-1,3,5-triazine-2-yl), melem (2,5,8-triamino 1,3,4,6,7,9,9b-heptaazaphenalene) and melon (poly[8-amino-1,3,4,6,7,9,9b-1-heptaazaphenalene-2,5-diyl). Other melamine-based fire retardant compounds are set forth hereinabove.

Borate fire retardant compounds include zinc borate, borax (sodium borate), ammonium borate, and calcium borate. Zinc borate is a boron-based fire retardant having the chemical composition $xZnO_3B_2O_3zH_2O$. Zinc borate can be used alone, or in conjunction with other chemical compounds, such as antimony oxide, alumina trihydrate, magnesium hydroxide or red phosphorous. It acts through zinc halide or zinc oxyhalide, which accelerate the decomposition of halogen sources and promote char formation.

Silicon-based materials include linear and branched chain-type silicone with (hydroxy or methoxy) or without (saturated hydrocarbons) functional reactive groups.

Phosphonic acid derivatives include phosphonic acid, ethylenediamine salt of phosphonic acid, tetrakis hydroxymethyl phosphonium chloride and n-methyl dimethylphosphono propionamide.

Examples of intumescent substances include, but are not limited to, ammonium polyphosphate, boric acid, chlorinated paraffin, DI-pentaerythritol, melamine, mono-ammonium phosphate, pentaerythritol, phosphate esters, polytetrafluoroethylene, tributoxyethyl phosphate, triethyl phosphate, tris(2-ethylhexyl)phosphonate, urea, xylene and zinc borate.

Examples of powdered metal containing flame retardant substances, which can be employed alone or in combination with other flame retardant substances, include, but are not limited to, magnesium oxide, magnesium chloride, talcum, alumina hydrate, zinc oxide, zinc borate, alumina trihydrate, alumina magnesium, calcium silicate, sodium silicate, zeolite, magnesium hydroxide, sodium carbonate, calcium carbonate, ammonium molybdate, iron oxide, copper oxide, zinc phosphate, zinc chloride, clay, sodium dihydrogen phosphate, tin, molybdenum and zinc.

Examples of fire retardant substances that can be applied to the fibers also include boric acid, boron oxide, calcium borate, alumina trihydrate (alumina hydroxide), alumina carbonate, hydrated aluminum, aluminum hydroxide, antimony oxide, antimony trioxide, antimony pentoxide, sodium antimonate, magnesium carbonate, potassium fluorotitanate, potassium fluorozirconate, zinc oxide, hunite-hydromagnesite, ammonium octamolybdate, ammonium bromide, ammonium sulfate, ammonium carbonate, ammonium oxylate, barium metaborate, molybdenum trioxide, zinc hydroxystannate, sodium tungstate, sodium antimonate, sodium stannate, sodium aluminate, sodium silicate, sodium bisulfate, ammonium borate, ammonium iodide, tin compounds, molybdic oxide, sodium antimonate, ammonium sulfamate, ammonium silicate, quaternary ammonium hydroxide, aluminum tryhydroxide, tetrabromobisphenol A, titanium compounds, zirconium compounds, other zinc compounds, such as zinc stannate and zinc hydroxy-stannate, dioxins, diethyl phosphite, methylamine boron-phosphate, cyanoquanidine, thiourea, ethyl urea, dicyandiamide and halogen-free phosphonic acid derivatives.

The chemistry may be added to the fibers using application methods known to those skilled in the art. The flame retardant may be singular, or in combination with other finishing chemistries like antistats, lubricants, binders, antimicrobials, color, water and oil repellents, surfactants, and other chemical auxiliaries known to the art. Following the application of the chemistry, which may be done using water or other solvents as a vehicle for uniformly distributing the treatment, the substrate is centrifuged and dried. Exemplary application processes are disclosed in U.S. Pat. No. 7,736,696 to Tintoria-Piana, incorporated herein by reference in its entirety.

By way of example, a closed-loop system and process can used for applying fire retardant chemicals to the fibers. The untreated fibers are first positioned in a vessel such as a dye machine, which circulates the fire retardant chemicals. The fire retardant chemicals may be in the form of a solution, a dispersion or emulsion. In some embodiments, the fire retardant chemicals are in the form of an aqueous solution. The fire retardant chemical solution, dispersions, emulsion or otherwise may be at room temperature or at an elevated temperature. In most embodiments, the fire retardant chemical solution, dispersions, emulsion or otherwise will be at a temperature from about 4° C. to about 100° C.; in other embodiments, from 20 to 50° C. and in still other embodiments, at about ambient temperature.

After absorption of the fire retardant composition on and/or into the fibers, non-absorbed fire retardant chemicals are recovered and re-used on subsequent batches of fibers. In some embodiments, the re-use of fire retardant chemicals can take place in the same vessel that is used to treat successive batches of fiber. Alternatively, recovery can be achieved by directing the non-absorbed fire retardant composition into a second dye machine containing additional fibers, or by extracting the fire retardant composition by centrifugation or other means, or by a combination of the two processes. The treated fibers may then be rinsed and dried. Alternatively, the fire retardant may be applied to the fibers at a subsequent stage of manufacturing, e.g., after blending with the binder fibers or forming the non-woven web, or after the non-woven web has been pleated.

Advantageously with respect to applying a fire retardant to lyocell fibers, because of its high moisture absorption and fiber cross section, it has been discovered that the fire retardant can be selected to permeate substantially throughout the cross sectional fiber structure unlike many types of fibers where the fire retardant coats exposed surfaces with minimal or no impregnation of the fire retardant into the fiber core. In one embodiment, ammonium polyphosphate can applied to the lyocell fiber and has been found to permeate substantially throughout a cross section of the lyocell fiber.

The batting from the treated fibers may be formed using one of several processes for converting a source of fiber into vertically oriented fibers as is generally known in the art. By way of example, the vertically oriented fibers can be formed as described in U.S. Pat. No. 5,702,801, incorporated herein by reference. In some embodiments, the peaks of the vertically oriented fibers in the batting material may be brushed or needle punched to improve the entwining of individual fibers of one peak into adjacent peaks. Adjacent peaks of vertically oriented fibers may be of substantially the same height, or alternatively may have different heights in a repeating pattern.

In some embodiments, the vertically oriented fibers can be in the form of pleats as discussed above. The pleats are formed from a cross laid non-woven web of fibers that can be less than 5 millimeters (mm) (i.e., about 0.2 inches) thick before pleating and in other embodiments, about 2 mm thick (e.g., a mattress approximately 2000 mm long can have about 500 pleats, each or two sheets). As previously described above, in most embodiments, the fibers are 0.25 to 4 inches long. During manufacture, once pleated, the pleated layer can be cross-needled to provide additional structural strength.

The pleating can provide a pleated layer having a thickness less than about 2 inches. By means of a carding process when the fibers are laid, greater than 75%, and greater than 90% in other embodiments of the fibers of the non-woven web are aligned substantially vertically oriented relative to the plane defined by an underlying mattress or cushioning article, for example.

As noted above, the non-woven web or the pleated layer can also include a binder fiber, which bonds the fibers to form a fiber mat. The binder fiber can be a bi-component fiber having a standard polyester core, e.g., having a melting point of about 250° C. within a low melting temperature polyester surround having a melting point of about 130° C. During manufacture, the non-woven web can be heat treated above the melting temperature of the fiber surround but beneath the temperature of the fiber core to cause the bi-component fibers to bind the fire retardant treated fibers. After pleating, the non-woven web can be cross-needled to enhance its strength. Optionally, the pleated layer may be cut during the manufacturing process as a result of the vertically lapped arrangement of fibers.

Flame retardant loading generally depends of the type of flame retardant and is generally at a loading of 13 to 20% based on a total weight of the fiber and the fire retardant.

Due to the vertical arrangement of the fibers in the pleated layer, when a load is applied to the cushioned article, e.g., mattress, the vertical arrangement of the fibers in the layer supports the load in a spring-like manner, compressing vertically to accommodate the shape of the load without flattening in the neighboring regions. In effect, the vertically oriented fibers, e.g., the vertically lapped formed pleats, act as vertical springs with cross needling to effect limited attachment between pleats but without causing pleats to flatten except under load. Moreover, when load is removed, the vertically oriented fibers readily recover it shape due to the independently spring-like nature of the vertically oriented fibers.

Advantageously, the vertically oriented fibers, e.g., vertically lapped formed pleats, have a low area density, which may result in lighter products and correspondingly less expensive manufacture and transport.

In order that the disclosure may be more readily understood, reference is made to the following examples, which are intended to illustrate the invention, but not limit the scope thereof.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flame resistant panel, consisting of:
   an adaptive cover layer comprising a multifunctional layer disposed on a fabric, wherein the multifunctional layer comprises a first functional component and a second functional component, the second functional component having a chemical-functional and constitutional specification for responsive behavior or a responsive property reversibly switchable by external stimulus, wherein the first and second functional components are different, wherein the first and second functional components are adjacent to one another on the fabric in a planar arrangement, wherein the first functional component is selected to be hydrophobic having a fixed length and the second functional component is selected to be hydrophilic at a first temperature and at a first length, and evaporative at a second temperature by a contraction in the first length, and
   a fire retardant layer comprising a plurality of substantially vertically oriented flame retardant treated lyocell fibers having been treated with a fire retardant chemical consisting of ammonium polyphosphate permeating substantially throughout a cross-sectional area of the lyocell fibers such that the plurality of substantially vertically oriented flame retardant treated lyocell fibers consist of lyocell fibers and the ammonium polyphosphate, and a plurality of vertically oriented non-flame retardant treated fibers extending from a top surface to a bottom surface of the fire retardant layer, wherein the fire retardant layer underlies the adaptive cover layer, wherein a loading of the fire retardant chemical in the fire retardant layer comprising the plurality of substantially vertically oriented flame retardant lyocell fibers treated is in an amount effective to meet a flammability standard defined in 16 CFR Part 1633 (2007), and wherein the adaptive cover layer in combination with the fire retardant layer are configured to encapsulate a mattress core.

2. The flame resistant panel of claim 1, wherein the first functional component is a spacer polymer.

3. The flame resistant panel of claim 1, wherein the plurality of vertically oriented non-flame retardant treated fibers are selected from the group consisting of polyester, polyolefins, cellulosic fibers and mixtures thereof.

4. The flame resistant panel of claim 3, wherein the cellulosic fibers comprise as cotton, rayon, wool, silk, acetate, nylon, lyocell, flax, ramie, jute, angora, kenaf or mixtures thereof.

5. The flame resistant panel of claim 1, wherein the flame resistant panel has a basis weight of 5 to 18 ounces per square yard.

6. The flame resistant panel of claim 1, wherein the flame resistant panel is a batting material, wherein the batting material has a thickness within a range of 0.5 inches to 3 inches.

7. The flame resistant panel of claim 1, wherein the substantially vertically oriented flame retardant treated lyocell fibers and the vertically oriented non-flame retardant treated fibers extending from the top surface to the bottom surface are in the form of pleats.

8. The flame resistant panel of claim 1, wherein the external stimulus is temperature.

9. The flame resistant panel of claim 1, wherein the second functional component is a responsive polymer selected from a group consisting of polyethylene oxide, polypropylene oxide derivatives, and copolymerizates thereof; ethoxylated and propoxylated polysaccharides; polyacrylamides; polyacrylates; and polyelectrolytes.

10. The flame resistant panel of claim 1, wherein the flame resistant panel is a batting material encapsulating the mattress core.

11. The flame resistant panel of claim 1, wherein the flame resistant panel is a component in a mattress assembly.

* * * * *